United States Patent
Young et al.

(10) Patent No.: US 10,503,181 B2
(45) Date of Patent: Dec. 10, 2019

(54) PRESSURE REGULATOR

(71) Applicant: Honeywell International Inc., Morris Plains, NJ (US)

(72) Inventors: Gregory Young, Blaine, MN (US); David Kucera, Bilovice nad Svitavou (CZ); Jos Praat, Borger (NL); Donald J. Kasprzyk, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 29 days.

(21) Appl. No.: 14/994,989

(22) Filed: Jan. 13, 2016

(65) Prior Publication Data
US 2017/0199530 A1  Jul. 13, 2017

(51) Int. Cl.
*G05D 16/20* (2006.01)

(52) U.S. Cl.
CPC ..... *G05D 16/2013* (2013.01); *G05D 16/2095* (2019.01)

(58) Field of Classification Search
CPC .......... G05D 16/0661; G05D 16/2093; G05D 16/20; G05D 16/2006; G05D 16/2095
USPC .... 73/1.57–1.72, 861.47, 861.48, 715–729.1
See application file for complete search history.

(56) References Cited

U.S. PATENT DOCUMENTS

| | | | |
|---|---|---|---|
| 156,769 A | 11/1874 | Cameron | |
| 424,581 A | 4/1890 | Sickels | |
| 1,033,204 A | 7/1912 | Skinner | |
| 1,147,840 A | 7/1915 | Bowser | |
| 1,156,977 A | 10/1915 | Cloos | |
| 1,165,315 A | 12/1915 | Cameron | |
| 1,206,532 A | 11/1916 | Gray | |
| 1,847,385 A | 3/1932 | Dengler | |
| 2,196,798 A | 4/1940 | Horstmann | |
| 2,403,692 A | 7/1946 | Tibbetts | |
| 2,791,238 A | 5/1957 | Bryant | |
| 2,975,307 A | 3/1961 | Schroeder et al. | |
| 3,164,364 A | 1/1965 | McColl | |
| 3,202,170 A | 8/1965 | Holbrook | |

(Continued)

FOREIGN PATENT DOCUMENTS

| DE | 3638604 | 5/1988 |
|---|---|---|
| DE | 19617852 | 10/1997 |

(Continued)

OTHER PUBLICATIONS

International Search Report and Written Opinion for PCT Application Serial No. PCT/US2017/012525, dated Apr. 18, 2017.

(Continued)

*Primary Examiner* — William M McCalister

(57) ABSTRACT

The disclosure relates generally to pressure regulators, and more particularly, to pressure regulating valves. In one illustrative but non-limiting example, a pressure in a flow channel is translated into a position of a diaphragm, wherein the position of the diaphragm is dependent on the pressure in the flow channel. The position of the diaphragm is then sensed. A position of a valve in the flow channel is then controlled to adjust the pressure in the flow channel acting on the diaphragm so that the sensed position of the diaphragm is driven toward a predetermined position. This may result in regulated pressure in the fluid channel.

7 Claims, 11 Drawing Sheets

(56) References Cited

U.S. PATENT DOCUMENTS

| | | | |
|---|---|---|---|
| 3,239,827 A * | 3/1966 | Werner | G01L 27/005 |
| | | | 200/83 R |
| 3,304,406 A | 2/1967 | King | |
| 3,346,008 A | 10/1967 | Scaramucci | |
| 3,381,623 A | 5/1968 | Elliott | |
| 3,414,010 A | 12/1968 | Sparrow | |
| 3,444,736 A * | 5/1969 | Stedman | G01F 1/383 |
| | | | 338/4 |
| 3,498,130 A * | 3/1970 | Brown | G01F 23/18 |
| | | | 73/301 |
| 3,641,373 A | 2/1972 | Elkuch | |
| 3,646,969 A | 3/1972 | Stampfli | |
| 3,744,754 A | 7/1973 | Demi | |
| 3,747,406 A * | 7/1973 | Maurer | G01F 1/383 |
| | | | 73/861.48 |
| 3,769,531 A | 10/1973 | Elkuch | |
| 3,803,424 A | 4/1974 | Smiley et al. | |
| 3,884,266 A | 5/1975 | Kondo | |
| 3,947,644 A | 3/1976 | Uchikawa | |
| 3,960,364 A | 6/1976 | Hargrave | |
| 3,973,576 A | 8/1976 | Dietiker | |
| 3,973,976 A | 8/1976 | Boyd | |
| 3,993,939 A | 11/1976 | Slavin et al. | |
| 4,114,652 A | 9/1978 | Oberle | |
| 4,115,036 A | 9/1978 | Paterson | |
| 4,140,936 A | 2/1979 | Bullock | |
| 4,188,013 A | 2/1980 | Battersby et al. | |
| 4,188,972 A | 2/1980 | Van Der Zee | |
| 4,197,737 A | 4/1980 | Pittman | |
| 4,242,080 A | 12/1980 | Tabei | |
| 4,277,832 A | 7/1981 | Wong | |
| 4,360,955 A | 11/1982 | Block | |
| 4,402,340 A | 9/1983 | Lockwood, Jr. | |
| 4,406,131 A | 9/1983 | Weasel, Jr. | |
| 4,406,400 A | 9/1983 | Berkhof | |
| 4,418,886 A | 12/1983 | Holzer | |
| 4,442,853 A | 4/1984 | Gort | |
| 4,450,868 A | 5/1984 | Duval et al. | |
| 4,453,169 A | 6/1984 | Martner | |
| 4,478,076 A | 10/1984 | Bohrer | |
| 4,478,077 A | 10/1984 | Bohrer et al. | |
| 4,481,776 A | 11/1984 | Araki et al. | |
| 4,491,149 A * | 1/1985 | Trinkwalder | G05D 16/0688 |
| | | | 137/458 |
| 4,493,303 A | 1/1985 | Thompson et al. | |
| 4,498,850 A | 2/1985 | Perlov et al. | |
| 4,501,144 A | 2/1985 | Higashi et al. | |
| 4,539,575 A | 9/1985 | Nilsson | |
| 4,543,974 A | 10/1985 | Dietiker et al. | |
| 4,576,050 A | 3/1986 | Lambert | |
| 4,581,624 A | 4/1986 | O'Connor | |
| 4,581,707 A | 4/1986 | Millar | |
| 4,585,209 A | 4/1986 | Aine et al. | |
| 4,619,438 A | 10/1986 | Coffee | |
| 4,622,699 A | 11/1986 | Spriggs | |
| 4,622,999 A | 11/1986 | Ray | |
| 4,645,450 A | 2/1987 | West | |
| 4,651,564 A | 3/1987 | Johnson et al. | |
| 4,654,546 A | 3/1987 | Kirjavainen | |
| 4,705,065 A * | 11/1987 | McNeely | F16K 17/10 |
| | | | 137/484.6 |
| 4,722,360 A | 2/1988 | Odajima et al. | |
| 4,756,508 A | 7/1988 | Giachino et al. | |
| 4,785,846 A | 11/1988 | Kragten | |
| 4,815,699 A | 3/1989 | Mueller | |
| 4,821,999 A | 4/1989 | Ohtaka | |
| 4,829,826 A | 5/1989 | Valentin et al. | |
| 4,835,717 A | 5/1989 | Michel et al. | |
| 4,836,247 A | 6/1989 | Chuang | |
| 4,898,200 A | 2/1990 | Odajima et al. | |
| 4,911,616 A | 3/1990 | Laumann, Jr. | |
| 4,915,613 A | 4/1990 | Landis | |
| 4,938,742 A | 7/1990 | Smits | |
| 4,939,405 A | 7/1990 | Okuyama et al. | |
| 5,022,435 A | 6/1991 | Jaw-Shiunn | |
| 5,065,978 A | 11/1991 | Albarda et al. | |
| 5,069,419 A | 12/1991 | Jerman | |
| 5,070,252 A | 12/1991 | Castenschiold et al. | |
| 5,078,581 A | 1/1992 | Blum et al. | |
| 5,082,242 A | 1/1992 | Bonne et al. | |
| 5,082,246 A | 1/1992 | Stanley et al. | |
| 5,085,562 A | 2/1992 | Van Lintel | |
| 5,096,388 A | 3/1992 | Weinberg | |
| 5,129,794 A | 7/1992 | Beatty | |
| 5,146,941 A | 9/1992 | Statler | |
| 5,148,074 A | 9/1992 | Fujita et al. | |
| 5,171,132 A | 12/1992 | Miyazaki et al. | |
| 5,176,358 A | 1/1993 | Bonne et al. | |
| 5,180,288 A | 1/1993 | Richter et al. | |
| 5,180,623 A | 1/1993 | Ohnstein | |
| 5,186,054 A | 2/1993 | Sekimura | |
| 5,190,068 A | 3/1993 | Philbin | |
| 5,192,197 A | 3/1993 | Culp | |
| 5,193,993 A | 3/1993 | Dietiker | |
| 5,199,456 A | 4/1993 | Love et al. | |
| 5,199,462 A | 4/1993 | Baker | |
| 5,203,688 A | 4/1993 | Dietiker | |
| 5,205,323 A | 4/1993 | Baker | |
| 5,206,557 A | 4/1993 | Bobbio | |
| 5,215,112 A | 6/1993 | Davison | |
| 5,215,115 A | 6/1993 | Dietiker | |
| 5,219,278 A | 6/1993 | Van Lintel | |
| 5,224,843 A | 7/1993 | Van Lintel | |
| 5,244,527 A | 9/1993 | Aoyagi | |
| 5,244,537 A | 9/1993 | Ohnstein | |
| 5,251,148 A * | 10/1993 | Haines | G05D 7/0635 |
| | | | 137/487.5 |
| 5,263,514 A | 11/1993 | Reeves | |
| 5,294,089 A | 3/1994 | LaMarca | |
| 5,322,258 A | 6/1994 | Bosch et al. | |
| 5,323,999 A | 6/1994 | Bonne | |
| 5,325,880 A | 7/1994 | Johnson et al. | |
| 5,336,062 A | 8/1994 | Richter | |
| 5,368,571 A | 11/1994 | Horres, Jr. | |
| 5,441,077 A * | 8/1995 | Smith | B05B 7/0081 |
| | | | 137/492.5 |
| 5,441,597 A | 8/1995 | Bonne et al. | |
| 5,449,142 A | 9/1995 | Banick | |
| 5,452,878 A | 9/1995 | Gravesen et al. | |
| 5,460,196 A * | 10/1995 | Yonnet | G05D 16/2093 |
| | | | 137/12 |
| 5,477,877 A | 12/1995 | Schulze et al. | |
| 5,499,909 A | 3/1996 | Yamada et al. | |
| 5,511,581 A * | 4/1996 | Ligh | F16K 17/10 |
| | | | 137/489 |
| 5,513,611 A | 5/1996 | Ricouard et al. | |
| 5,520,533 A | 5/1996 | Vrolijk | |
| 5,526,172 A | 6/1996 | Kanack | |
| 5,529,465 A | 6/1996 | Zengerle et al. | |
| 5,536,963 A | 7/1996 | Polla | |
| 5,538,220 A | 7/1996 | LaMarca | |
| 5,541,465 A | 7/1996 | Higuchi et al. | |
| 5,549,137 A * | 8/1996 | Lenz | G05D 7/005 |
| | | | 137/486 |
| 5,552,654 A | 9/1996 | Konno et al. | |
| 5,565,832 A | 10/1996 | Haller et al. | |
| 5,571,401 A | 11/1996 | Lewis et al. | |
| 5,580,444 A | 12/1996 | Burrows | |
| 5,590,235 A | 12/1996 | Rappenecker et al. | |
| 5,621,164 A | 4/1997 | Woodbury et al. | |
| 5,642,015 A | 6/1997 | Whitehead et al. | |
| 5,676,342 A | 10/1997 | Otto et al. | |
| 5,683,159 A | 11/1997 | Johnson | |
| 5,696,662 A | 12/1997 | Bauhahn | |
| 5,725,363 A | 3/1998 | Bustgens et al. | |
| 5,735,503 A | 4/1998 | Hietkamp | |
| 5,741,978 A | 4/1998 | Gudmundsson | |
| 5,748,432 A | 5/1998 | Przywozny et al. | |
| 5,750,903 A * | 5/1998 | Ryhanen | G01F 1/383 |
| | | | 73/861.48 |
| 5,755,259 A | 5/1998 | Schulze et al. | |
| 5,759,014 A | 6/1998 | Van Lintel | |
| 5,759,015 A | 6/1998 | Van Lintel et al. | |

(56) References Cited

U.S. PATENT DOCUMENTS

| | | | |
|---|---|---|---|
| 5,760,577 A * | 6/1998 | Shizuya | G01B 7/00 |
| | | | 177/210 EM |
| 5,769,043 A | 6/1998 | Nitkiewicz | |
| 5,774,372 A | 6/1998 | Berwanger | |
| 5,790,420 A | 8/1998 | Lang | |
| 5,792,957 A | 8/1998 | Luder et al. | |
| 5,797,358 A | 8/1998 | Brandt et al. | |
| 5,808,205 A | 9/1998 | Romo | |
| 5,822,170 A | 10/1998 | Cabuz et al. | |
| 5,827,950 A | 10/1998 | Woodbury et al. | |
| 5,836,348 A * | 11/1998 | Ostand | F16K 17/10 |
| | | | 137/209 |
| 5,836,750 A | 11/1998 | Cabuz | |
| 5,839,467 A | 11/1998 | Saaski et al. | |
| 5,847,523 A | 12/1998 | Rappenecker et al. | |
| 5,863,708 A | 1/1999 | Zanzucchi et al. | |
| 5,887,847 A | 3/1999 | Holborow | |
| 5,893,389 A | 4/1999 | Cunningham | |
| 5,901,939 A | 5/1999 | Cabuz et al. | |
| 5,911,872 A | 6/1999 | Lewis et al. | |
| 5,918,852 A | 7/1999 | Otto | |
| 5,933,573 A | 8/1999 | Lukenich et al. | |
| 5,944,257 A | 8/1999 | Dietiker et al. | |
| 5,954,079 A | 9/1999 | Barth et al. | |
| 5,954,089 A | 9/1999 | Seymour | |
| 5,957,158 A | 9/1999 | Volz et al. | |
| 5,959,448 A | 9/1999 | Baranski et al. | |
| 5,967,124 A | 10/1999 | Cook et al. | |
| 5,971,355 A | 10/1999 | Biegelsen et al. | |
| 5,986,573 A | 11/1999 | Franklin et al. | |
| 6,003,552 A | 12/1999 | Shank et al. | |
| 6,050,281 A | 4/2000 | Adams et al. | |
| 6,057,771 A | 5/2000 | Lakra | |
| 6,106,245 A | 8/2000 | Cabuz | |
| 6,109,889 A | 8/2000 | Zengerle et al. | |
| 6,116,863 A | 9/2000 | Ahn et al. | |
| 6,122,973 A | 9/2000 | Nomura et al. | |
| 6,151,967 A | 11/2000 | McIntosh et al. | |
| 6,152,168 A | 11/2000 | Ohmi et al. | |
| 6,155,531 A | 12/2000 | Holborow et al. | |
| 6,167,761 B1 | 1/2001 | Hanzawa et al. | |
| 6,179,000 B1 | 1/2001 | Zdobinski et al. | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,189,568 B1 | 2/2001 | Bergum et al. | |
| 6,215,221 B1 | 4/2001 | Cabuz et al. | |
| 6,240,944 B1 | 6/2001 | Ohnstein et al. | |
| 6,242,909 B1 | 6/2001 | Dorsey et al. | |
| 6,247,919 B1 | 6/2001 | Welz, Jr. et al. | |
| 6,255,609 B1 | 7/2001 | Samuelson et al. | |
| 6,263,908 B1 | 7/2001 | Love et al. | |
| 6,288,472 B1 | 9/2001 | Cabuz et al. | |
| 6,297,640 B1 | 10/2001 | Hayes | |
| 6,321,781 B1 | 11/2001 | Kurth | |
| 6,360,773 B1 | 3/2002 | Rhodes | |
| 6,373,682 B1 | 4/2002 | Goodwin-Johansson | |
| 6,386,234 B2 | 5/2002 | Sontag | |
| 6,390,027 B1 | 5/2002 | Lyons et al. | |
| 6,397,798 B1 | 6/2002 | Fiaccabrino | |
| 6,401,753 B2 | 6/2002 | Neu | |
| 6,418,793 B1 | 7/2002 | Pechoux et al. | |
| 6,445,053 B1 | 9/2002 | Cho | |
| 6,450,200 B1 | 9/2002 | Ollivier | |
| 6,460,567 B1 | 10/2002 | Hansen, III et al. | |
| 6,463,546 B1 | 10/2002 | Jeske et al. | |
| 6,496,348 B2 | 12/2002 | McIntosh | |
| 6,496,786 B1 | 12/2002 | Dieterle et al. | |
| 6,505,838 B1 | 1/2003 | Cavaliere | |
| 6,508,528 B2 | 1/2003 | Fujii et al. | |
| 6,520,753 B1 | 2/2003 | Grosjean et al. | |
| 6,536,287 B2 | 3/2003 | Beekhuizen et al. | |
| 6,539,315 B1 * | 3/2003 | Adams | G01F 1/363 |
| | | | 137/487.5 |
| 6,550,495 B1 | 4/2003 | Schulze | |
| 6,553,979 B2 | 4/2003 | Albright | |
| 6,561,791 B1 | 5/2003 | Vrolijk et al. | |
| 6,563,233 B1 | 5/2003 | Hinks | |
| 6,564,824 B2 | 5/2003 | Lowery et al. | |
| 6,571,817 B1 | 6/2003 | Bohan, Jr. | |
| 6,572,077 B1 | 6/2003 | Worner | |
| 6,579,087 B1 | 6/2003 | Vrolijk | |
| 6,584,852 B2 | 7/2003 | Suzuki et al. | |
| 6,590,267 B1 | 7/2003 | Goodwin-Johansson et al. | |
| 6,606,911 B2 | 8/2003 | Akiyama et al. | |
| 6,619,388 B2 | 9/2003 | Dietz et al. | |
| 6,619,612 B2 | 9/2003 | Freisinger et al. | |
| 6,623,012 B1 | 9/2003 | Perry et al. | |
| 6,640,642 B1 | 11/2003 | Onose et al. | |
| 6,644,351 B2 | 11/2003 | LaMarca et al. | |
| 6,650,211 B2 | 11/2003 | Pimouguet | |
| 6,651,506 B2 | 11/2003 | Lee et al. | |
| 6,651,636 B1 | 11/2003 | Albright | |
| 6,651,954 B1 | 11/2003 | Porcher et al. | |
| 6,655,409 B1 | 12/2003 | Steenburgh et al. | |
| 6,655,652 B2 | 12/2003 | Meinhof | |
| 6,658,928 B1 | 12/2003 | Pollack et al. | |
| 6,676,580 B2 | 1/2004 | Tsai et al. | |
| 6,704,186 B2 | 3/2004 | Ishikura | |
| 6,725,167 B2 | 4/2004 | Grumstrup et al. | |
| 6,728,600 B1 | 4/2004 | Contaldo et al. | |
| 6,729,601 B2 | 5/2004 | Freisinger et al. | |
| 6,742,541 B2 | 6/2004 | Pimouguet | |
| 6,767,188 B2 | 7/2004 | Vrane et al. | |
| 6,768,406 B1 | 7/2004 | Fiaccabrino | |
| 6,779,541 B2 * | 8/2004 | Inayama | G05D 16/2093 |
| | | | 137/102 |
| 6,796,326 B2 | 9/2004 | Bayer | |
| 6,813,954 B2 | 11/2004 | Gokhfeld | |
| 6,814,102 B2 | 11/2004 | Hess et al. | |
| 6,814,339 B2 | 11/2004 | Berger et al. | |
| 6,819,208 B1 | 11/2004 | Peghaire et al. | |
| 6,820,650 B2 | 11/2004 | Solet et al. | |
| 6,825,632 B2 | 11/2004 | Hahn et al. | |
| 6,826,947 B2 | 12/2004 | Solet et al. | |
| 6,851,298 B2 | 2/2005 | Miura et al. | |
| 6,874,367 B2 | 4/2005 | Jakobsen | |
| 6,877,380 B2 | 4/2005 | Lewis | |
| 6,877,383 B2 | 4/2005 | Horie et al. | |
| 6,880,548 B2 | 4/2005 | Schultz et al. | |
| 6,880,567 B2 | 4/2005 | Klaver et al. | |
| 6,885,184 B1 | 4/2005 | Gofman | |
| 6,888,354 B1 | 5/2005 | Gofman | |
| 6,889,705 B2 | 5/2005 | Newman et al. | |
| 6,892,756 B2 | 5/2005 | Schulze | |
| 6,906,484 B1 | 6/2005 | Berroth et al. | |
| 6,923,069 B1 | 8/2005 | Stewart | |
| 6,956,340 B2 | 10/2005 | Schondelmaier et al. | |
| 6,956,343 B2 | 10/2005 | Berroth et al. | |
| 6,968,851 B2 | 11/2005 | Ramirez et al. | |
| 6,981,426 B2 | 1/2006 | Wang et al. | |
| 6,983,759 B2 | 1/2006 | Maichel et al. | |
| 6,994,308 B1 | 2/2006 | Wang et al. | |
| 6,997,684 B2 | 2/2006 | Hahn et al. | |
| 7,000,635 B2 | 2/2006 | Erbe et al. | |
| 7,004,034 B2 | 2/2006 | Chen | |
| 7,039,502 B2 | 5/2006 | Berwanger et al. | |
| 7,066,203 B2 | 6/2006 | Baarda | |
| 7,082,835 B2 | 8/2006 | Cook et al. | |
| 7,089,086 B2 | 8/2006 | Schoonover | |
| 7,089,959 B2 | 8/2006 | Cai | |
| 7,093,611 B2 | 8/2006 | Murray et al. | |
| 7,107,820 B2 | 9/2006 | Nunnally et al. | |
| 7,119,504 B2 | 10/2006 | Dornhof | |
| 7,121,525 B2 | 10/2006 | Gelez | |
| 7,174,771 B2 | 2/2007 | Cooper | |
| 7,178,335 B2 | 2/2007 | Bickley | |
| 7,216,547 B1 | 5/2007 | Stewart et al. | |
| 7,223,094 B2 | 5/2007 | Goebel | |
| 7,225,056 B2 | 5/2007 | Bolduan et al. | |
| 7,249,610 B2 | 7/2007 | Moses | |
| 7,290,502 B2 | 11/2007 | Kidd et al. | |
| 7,297,640 B2 | 11/2007 | Xie et al. | |
| 7,302,863 B2 | 12/2007 | Kielb et al. | |

(56) References Cited

U.S. PATENT DOCUMENTS

| | | | |
|---|---|---|---|
| 7,319,300 B2 | 1/2008 | Hahn | |
| 7,328,719 B2 | 2/2008 | Madden | |
| 7,335,396 B2 * | 2/2008 | Carpenter | C23C 16/45525 |
| | | | 118/692 |
| 7,347,221 B2 | 3/2008 | Berger et al. | |
| 7,360,751 B2 | 4/2008 | Herrfurth | |
| 7,386,981 B2 | 6/2008 | Zielinski et al. | |
| 7,390,172 B2 | 6/2008 | Winkler | |
| 7,402,925 B2 | 7/2008 | Best et al. | |
| 7,405,609 B2 | 7/2008 | Krotsch | |
| 7,422,028 B2 | 9/2008 | Nugent et al. | |
| 7,451,600 B2 | 11/2008 | Patel et al. | |
| 7,451,644 B2 | 11/2008 | Karte | |
| 7,453,696 B2 | 11/2008 | Tungl et al. | |
| 7,461,828 B2 | 12/2008 | Kidprasert | |
| 7,493,822 B2 | 2/2009 | Stewart et al. | |
| 7,503,221 B2 | 3/2009 | Wade | |
| 7,520,487 B2 | 4/2009 | Mattes | |
| 7,537,019 B2 | 5/2009 | Ting et al. | |
| 7,543,604 B2 | 6/2009 | Benda | |
| 7,553,151 B2 | 6/2009 | O'Mara et al. | |
| 7,556,238 B2 | 7/2009 | Seberger | |
| 7,574,896 B1 | 8/2009 | Cooper | |
| 7,586,228 B2 | 9/2009 | Best | |
| 7,586,276 B2 | 9/2009 | Dornhoff | |
| 7,624,755 B2 | 12/2009 | Benda et al. | |
| 7,627,455 B2 | 12/2009 | Lenz et al. | |
| 7,644,731 B2 | 1/2010 | Benda et al. | |
| 7,669,461 B2 | 3/2010 | Kates | |
| 7,688,011 B2 | 3/2010 | Berroth et al. | |
| 7,715,168 B2 | 5/2010 | Gofman et al. | |
| 7,740,024 B2 | 6/2010 | Brodeur et al. | |
| 7,759,884 B2 | 7/2010 | Dufner et al. | |
| 7,811,069 B2 | 10/2010 | Fleig | |
| 7,812,488 B2 | 10/2010 | Cosco et al. | |
| 7,816,813 B2 | 10/2010 | Yagudayev et al. | |
| 7,841,541 B2 | 11/2010 | Ardelt et al. | |
| 7,869,971 B2 | 1/2011 | Varga | |
| 7,880,421 B2 | 2/2011 | Karwath | |
| 7,880,427 B2 | 2/2011 | Foll et al. | |
| 7,890,216 B2 | 2/2011 | Boger et al. | |
| 7,890,276 B2 | 2/2011 | Killion et al. | |
| 7,891,972 B2 | 2/2011 | Blank et al. | |
| 7,898,372 B2 | 3/2011 | Melchionne, Jr. | |
| 7,902,776 B2 | 3/2011 | Karwath | |
| 7,905,251 B2 | 3/2011 | Flanders | |
| 7,922,481 B2 | 4/2011 | Geiger et al. | |
| 7,940,189 B2 | 5/2011 | Brown | |
| 8,020,585 B2 | 9/2011 | Shock et al. | |
| 8,036,837 B2 | 10/2011 | Wilke | |
| 8,066,255 B2 | 11/2011 | Wang | |
| 8,109,289 B2 * | 2/2012 | Trnka | F24D 19/1015 |
| | | | 137/487 |
| 8,126,631 B2 | 2/2012 | Scalia, Jr. | |
| 8,205,484 B2 | 6/2012 | Sasaki | |
| 8,225,814 B2 | 7/2012 | Igarashi | |
| 8,240,636 B2 | 8/2012 | Smith | |
| 8,256,445 B2 | 9/2012 | Arnett | |
| 8,265,794 B2 | 9/2012 | Minervini et al. | |
| 8,271,141 B2 | 9/2012 | Cummings et al. | |
| 8,307,845 B2 | 11/2012 | Kouchi et al. | |
| 8,381,760 B2 | 2/2013 | Santinanavat et al. | |
| 8,387,441 B2 | 3/2013 | Falta et al. | |
| 8,555,914 B2 * | 10/2013 | Smith, IV | E21B 37/06 |
| | | | 137/10 |
| 8,639,464 B2 | 1/2014 | Artiuch et al. | |
| 8,813,776 B2 | 8/2014 | Stark et al. | |
| 8,905,063 B2 * | 12/2014 | Young | F23N 1/002 |
| | | | 137/486 |
| 8,914,094 B2 | 12/2014 | Victorine et al. | |
| 9,200,716 B2 | 12/2015 | Mevius et al. | |
| 9,393,388 B2 | 7/2016 | Seaver et al. | |
| 2002/0157713 A1 | 10/2002 | Pimouguet | |
| 2002/0174899 A1 * | 11/2002 | Adams | G05D 7/0635 |
| | | | 137/487.5 |
| 2002/0175791 A1 | 11/2002 | LaMarca et al. | |
| 2003/0011136 A1 | 1/2003 | Ramirez et al. | |
| 2003/0117098 A1 | 6/2003 | Berroth et al. | |
| 2003/0150499 A1 | 8/2003 | Solet et al. | |
| 2003/0167851 A1 | 9/2003 | Parker | |
| 2003/0201414 A1 | 10/2003 | Freisinger et al. | |
| 2004/0035211 A1 | 2/2004 | Pinto et al. | |
| 2004/0129909 A1 | 7/2004 | Wiese | |
| 2004/0263103 A1 | 12/2004 | Weisser et al. | |
| 2005/0058961 A1 | 3/2005 | Moses | |
| 2005/0166979 A1 | 8/2005 | Berger et al. | |
| 2005/0199286 A1 | 9/2005 | Appleford et al. | |
| 2005/0255418 A1 | 11/2005 | Goebel | |
| 2005/0279956 A1 | 12/2005 | Berger et al. | |
| 2006/0202572 A1 | 9/2006 | Tungl et al. | |
| 2006/0226299 A1 | 10/2006 | Tungl et al. | |
| 2006/0228237 A1 | 10/2006 | Winkler | |
| 2006/0243334 A1 | 11/2006 | Brochhaus et al. | |
| 2006/0260701 A1 | 11/2006 | Mattes | |
| 2006/0272712 A1 | 12/2006 | Sontag | |
| 2006/0278281 A1 | 12/2006 | Gynz-Rekowski et al. | |
| 2007/0024225 A1 | 2/2007 | Hahn et al. | |
| 2007/0068511 A1 | 3/2007 | Bachinsky et al. | |
| 2007/0089789 A1 | 4/2007 | Mudd et al. | |
| 2007/0095144 A1 | 5/2007 | Oboodi et al. | |
| 2007/0164243 A1 | 7/2007 | Volz | |
| 2007/0189739 A1 | 8/2007 | Dufner et al. | |
| 2007/0221276 A1 | 9/2007 | Buezis et al. | |
| 2007/0241705 A1 | 10/2007 | Karwath | |
| 2007/0256478 A1 | 11/2007 | Guadagnoia et al. | |
| 2007/0257628 A1 | 11/2007 | Gofman et al. | |
| 2008/0035456 A1 | 2/2008 | Melchionn, Jr. | |
| 2008/0099082 A1 | 5/2008 | Moenkhaus | |
| 2008/0156077 A1 | 7/2008 | Flanders et al. | |
| 2008/0157707 A1 | 7/2008 | Jeske et al. | |
| 2008/0297084 A1 | 12/2008 | Berroth et al. | |
| 2008/0315807 A1 | 12/2008 | Loffler et al. | |
| 2008/0318098 A1 | 12/2008 | Matsunaga | |
| 2008/0318172 A1 | 12/2008 | Geiger et al. | |
| 2009/0068503 A1 | 3/2009 | Yamazaki et al. | |
| 2009/0126798 A1 | 5/2009 | Mather | |
| 2009/0142717 A1 | 6/2009 | Lavelle | |
| 2009/0146091 A1 | 6/2009 | Ams et al. | |
| 2009/0148798 A1 | 6/2009 | Geiger et al. | |
| 2009/0240445 A1 | 9/2009 | Umekage et al. | |
| 2009/0280989 A1 | 11/2009 | Astra et al. | |
| 2009/0303076 A1 | 12/2009 | Setiadi et al. | |
| 2010/0006165 A1 | 1/2010 | Banta et al. | |
| 2010/0018324 A1 | 1/2010 | Killian et al. | |
| 2010/0043896 A1 | 2/2010 | Shock et al. | |
| 2010/0064818 A1 | 3/2010 | Shubert | |
| 2010/0074777 A1 | 3/2010 | Laufer et al. | |
| 2010/0102259 A1 | 4/2010 | Forster | |
| 2010/0112500 A1 | 5/2010 | Maiello et al. | |
| 2010/0180688 A1 | 7/2010 | Khemet et al. | |
| 2010/0180882 A1 | 7/2010 | Oberhomburg et al. | |
| 2010/0193045 A1 | 8/2010 | Xu | |
| 2010/0254826 A1 | 10/2010 | Streng et al. | |
| 2010/0269931 A1 | 10/2010 | Seebauer | |
| 2010/0282988 A1 | 11/2010 | Kasprzyk et al. | |
| 2010/0315027 A1 | 12/2010 | Wystup et al. | |
| 2011/0005250 A1 * | 1/2011 | Perz | G05D 16/2013 |
| | | | 62/222 |
| 2011/0025237 A1 | 2/2011 | Wystup et al. | |
| 2011/0033808 A1 | 2/2011 | Geiger et al. | |
| 2011/0039217 A1 | 2/2011 | Happe | |
| 2011/0046903 A1 | 2/2011 | Franklin | |
| 2011/0080072 A1 | 4/2011 | Strobel et al. | |
| 2011/0137579 A1 | 6/2011 | Seebauer | |
| 2011/0240157 A1 | 10/2011 | Jones et al. | |
| 2011/0266473 A1 | 11/2011 | Santinanavat et al. | |
| 2011/0270544 A1 | 11/2011 | Kucera et al. | |
| 2011/0284777 A1 | 11/2011 | Pitchford et al. | |
| 2012/0232461 A1 * | 9/2012 | Seaver | A61M 27/006 |
| | | | 604/9 |
| 2013/0152673 A1 | 6/2013 | Young et al. | |
| 2013/0153035 A1 | 6/2013 | Young et al. | |

(56) References Cited

U.S. PATENT DOCUMENTS

| | | | |
|---|---|---|---|
| 2013/0153036 A1 | 6/2013 | Young et al. | |
| 2013/0153041 A1 | 6/2013 | Kucera et al. | |
| 2013/0153042 A1 | 6/2013 | Young et al. | |
| 2013/0153062 A1 | 6/2013 | Young et al. | |
| 2013/0153798 A1 | 6/2013 | Kucera et al. | |
| 2013/0154841 A1 | 6/2013 | Kucera et al. | |
| 2014/0080075 A1 | 3/2014 | Young et al. | |
| 2014/0096850 A1 | 4/2014 | Filkovski et al. | |
| 2014/0150874 A1* | 6/2014 | Garvey | G05D 16/166 137/1 |
| 2015/0045971 A1 | 2/2015 | Endel et al. | |
| 2015/0107675 A1 | 4/2015 | Kucera | |
| 2015/0359666 A1 | 12/2015 | Zacharias | |
| 2017/0199530 A1* | 7/2017 | Young | G05D 16/0661 |

FOREIGN PATENT DOCUMENTS

| | | |
|---|---|---|
| DE | 19824521 | 12/1999 |
| DE | 102005033611 | 10/2006 |
| EP | 0275439 | 7/1988 |
| EP | 0282758 | 9/1988 |
| EP | 0356690 | 5/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 0881435 | 9/2001 |
| EP | 1186779 | 3/2002 |
| EP | 0976957 | 4/2002 |
| EP | 1157205 | 9/2002 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |
| JP | 2004125809 | 4/2004 |
| JP | 2004309159 | 11/2004 |
| JP | 2008135922 | 6/2008 |
| JP | 2008286478 | 11/2008 |
| SU | 744877 | 6/1980 |
| WO | WO 87/05375 | 9/1987 |
| WO | WO 96/27095 | 9/1996 |
| WO | WO 97/29538 | 8/1997 |
| WO | WO 99/24758 | 5/1999 |
| WO | WO 99/60292 | 11/1999 |
| WO | WO 99/64769 | 12/1999 |
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |

(56) References Cited

FOREIGN PATENT DOCUMENTS

| WO | WO 02/084156 | 10/2002 |
|---|---|---|
| WO | WO 02/086365 | 10/2002 |
| WO | WO 02/086918 | 10/2002 |
| WO | WO 02/097840 | 12/2002 |
| WO | WO 2004/059830 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | WO 2007/012419 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |
| WO | WO 2015/033046 | 3/2015 |

OTHER PUBLICATIONS

"Flexible, Compact and with a High Performance—the New Valvario, G. Kromschroder AG Launches it's New, Improved Series of Gas Fittings," Press Release, 2 pages, 2003.
"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. On Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., , pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
U.S. Appl. No. 14/992,826, filed Jan. 11, 2016.
CSA, "B149.3S1-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65-DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.

(56) References Cited

OTHER PUBLICATIONS

Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics" IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE, pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc. "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Universal Metering, "SmartValve Wireless Shut-Off Valve," Universal Metering Ltd., 4 pages, prior to Mar. 12, 2013.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.

\* cited by examiner

PRESSURE REGULATOR

TECHNICAL FIELD

The disclosure relates generally to pressure regulators, and more particularly, to pressure regulating valves.

BACKGROUND

Valves are commonly used in conjunction with many appliances for regulating the flow of fluid. For example, gas valves are often incorporated into gas-fired appliances to control the flow of gas to a combustion chamber or burner. Examples of such gas-fired appliances may include, but are not limited to, water heaters, furnaces, boilers, fireplace inserts, stoves, ovens, dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, in response to a control signal from a control device such as a thermostat or other controller, the gas valve may be moved between a closed position, which prevents gas flow, and an open position, which allows gas flow. In some instances, the gas valve may include a pressure regulator to help regulate the pressure of the gas that is ultimately delivered by the gas valve to the appliance. What would be desirable is an improved pressure regulator.

SUMMARY

The disclosure relates generally to pressure regulators, and more particularly, to pressure regulating valves. In one illustrative but non-limiting example, a pressure regulator may include a housing, a spring, a diaphragm, a stem in communication with the diaphragm, and a position sensor. The housing may have an interior and exterior, with the spring positioned at least partially within the interior of the housing. The diaphragm may be in communication with a fluid channel, with a first side facing the spring and a second side facing the fluid channel. The position sensor may be configured to sense a longitudinal position of the stem and a longitudinal translation of the stem in response to movement of the diaphragm due, at least in part, to a change in pressure in the fluid channel. In some cases, the longitudinal position of the stem may be used to control a valve that regulates the pressure in the fluid channel.

In another example, a pressure regulating valve assembly may include a housing, a valve member, a valve actuator, a pressure sensing chamber, a reference chamber, a diaphragm, a bias mechanism, a position sensor, and a controller. The housing may have an input port and an output port, with a flow channel extending between the input port and the output port. The valve actuator may be operatively coupled to the valve member for controlling a position of the valve member and thus, a flow rate of fluid through the fluid channel (e.g., across the valve member). The diaphragm may fluidly separate the pressure sensing chamber from the reference chamber. The pressure sensing chamber may be in fluid communication with a downstream side of the flow channel, where the valve member may separate an upstream side of the flow channel from the downstream side of the flow channel. The bias mechanism may apply a bias force to the diaphragm toward the pressure sensing chamber, such that a pressure differential between the pressure sensing chamber and the reference chamber may provide a counter force to the bias force. A current position of the diaphragm may be at least partially dependent on the differential between the bias force and counter force.

The controller may be operatively coupled to the valve actuator and the position sensor. The controller may control the valve actuator to position the valve member based at least in part on a current position of the diaphragm. In some cases, the controller may control a position of the valve member (e.g., via a valve actuator) such that the current position of the diaphragm may be driven toward a control position that may result in a constant or substantially constant pressure (e.g. regulated pressure) at the output port of the housing over a predefined range of input pressures.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various illustrative embodiments in connection with the accompanying drawings, in which.

Figure 1:
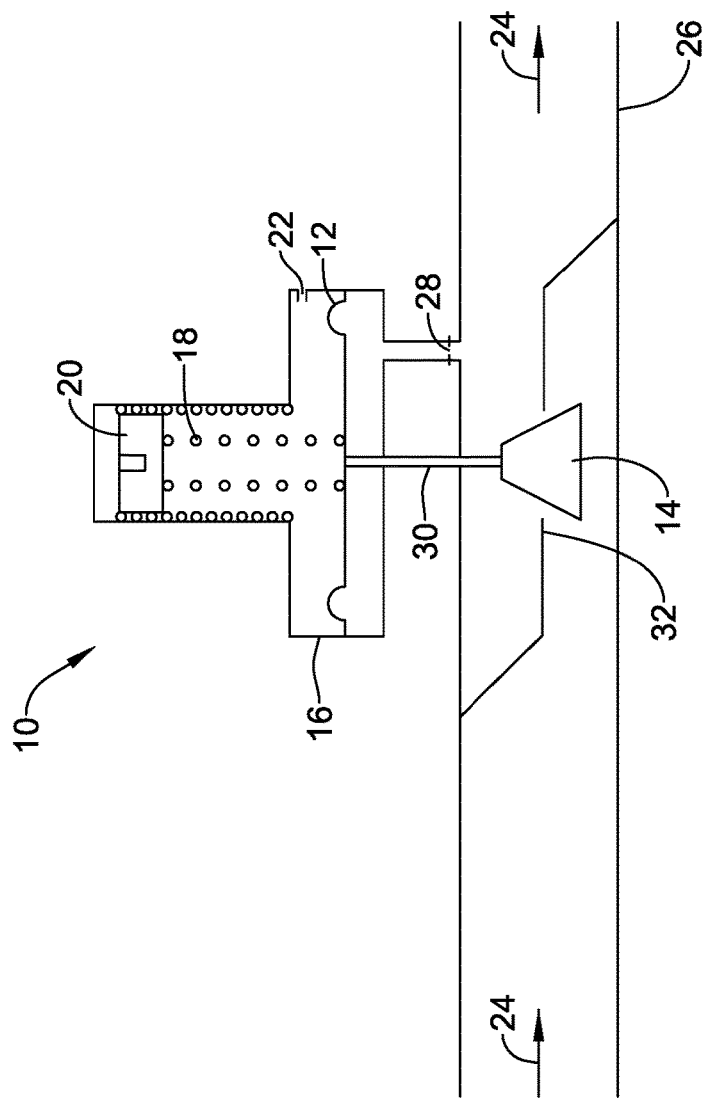
FIG. 1 is a schematic cross-sectional view of an illustrative prior art pressure regulator.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Gas valves may be added to fluid path systems supplying fuel and/or fluid to appliances (e.g., burners, etc.) or may be used individually or in different systems. In some instances, gas safety shutoff valves may be utilized as automatic redundant valves. Redundancy is achieved, and often times required by regulatory agencies, by placing at least two safety shutoff valves in series. The aforementioned redundant valves may be separate valves fitted together in the field and/or valves located together in a single valve body. These redundant valves are commonly referred to as double-block valves. In accordance with this disclosure, these and other gas valves may be fitted to include sensors and/or switches and/or other mechanical or electronic devices to assist in monitoring and/or analyzing the operation of the gas valve and/or connected appliance. The sensors and/or switches may be of the electromechanical type and/or the electronic type, or of other types of sensors and/or switches, as desired.

In some cases, a gas valve assembly may be configured to monitor and/or control various operations including, but not limited to, monitoring fluid flow and/or fluid consumption, electronic cycle counting, overpressure diagnostics, high gas pressure and low gas pressure detection, valve proving system tests, valve leakage tests, proof of valve closure tests, diagnostic communications, and/or any other suitable operation as desired. In some gas flow systems (e.g., combustion systems and/or other systems), gas flow may be controlled to optimize system efficiency as well as to prevent generation of pollutants or hazardous gases.

Illustratively, a pressure regulating valve (PRV) may be a system component that may facilitate the system performing accurately. In some cases, a PRV may rely on a direct or servo pneumatic regulator. However, such a regulator may have one or more problems including, but not limited to, sensitivity to pressure surges (e.g., from a burner light-off pulse), limited turndown capability (e.g., a limited range of regulation), oscillation/stability issues, mounting orientation, pressure/flow dependent drift, etc.

FIG. 1 is a schematic of a prior art PRV 10. With PRV 10 there may be a mechanical or pneumatic linkage between a diaphragm 12 and a valve member 14 (e.g., a valve disk). Such a PRV 10 may include a housing 16, a bias mechanism 18 (e.g., a spring or other mechanism for applying a bias), a bias adjuster 20, and a vent 22 in the housing 16. The PRV 10 may be in communication with a fluid flow 24 (e.g., a flow of gas or liquid) in a flow channel 26 through an orifice 28. The PRV may be integrally formed with (e.g., monolithically formed or permanently affixed to) the flow channel 26 or may be directly or indirectly removably connected to the flow channel 26. The vent 22 in the housing 16 may be configured to provide atmospheric pressure at the back side of the diaphragm 12 as shown in FIG. 1, and/or the vent may be hooked up to an alternate reference (for example, a combustion chamber of a burner appliance and/or other reference).

The valve member 14 may be connected to the diaphragm 12 via a stem 30 or other connector that may result in an axial movement of the valve member 14 in response to a deflection of the diaphragm 12. In some cases, the flow channel 26 may include a valve seat 32 defining an opening through which the fluid flow 24 flows as it flows through the flow channel 26. The valve member 14 may be configured to move axially nearer and farther from the valve seat 32 with movement of the diaphragm 12.

In operation, the PRV 10 may be in communication with a pressure in the flow channel 26 via the orifice 28, which pressure may then act on the diaphragm 12. The bias 18 may act on a first side (e.g. back side) of the diaphragm 12 and the pressure in the fluid flow 24 may act on a second side (e.g. front side) of the diaphragm 12, where the amount of pressure or force applied to the first side (e.g. back side) of the diaphragm 12 may be adjusted by adjusting the bias adjuster 20. The PRV 10 may be configured to adjust a position of the valve member 14 relative to the valve seat 32 until the resultant force caused by the pressure on the first side (e.g. back side) of the diaphragm 12 and the force on the second side (e.g. front side) of the diaphragm 12 are equal or substantially equal. Thus, a pressure downstream of the valve seat 32 may be regulated by adjusting the bias adjuster 20 and thus a resulting bias force applied to the diaphragm 12.

In one example, the bias adjuster 20 may be adjusted so that the bias mechanism 18 applies a desired amount of force on the first side (e.g. back side) of the diaphragm 12 so as to maintain a desired pressure in the flow channel 26. The diaphragm 12, the stem 30, and the valve member 14 may be in communication with one another such that the valve member 14 may be spaced from the valve seat 32 a desired distance when the force acting on the first side (e.g. back side) of the diaphragm 12 is equal to the force acting on the second side (e.g. front side) of the diaphragm 12. Thus, when the forces acting on the first side (e.g. back side) and the second side (e.g. front side) of the diaphragm are not equal, the diaphragm 12 may deflect causing the stem 30 to move axially and adjust the space between the valve member 14 and the valve seat 32 until the forces acting on the second side (e.g. front side) of the diaphragm 12 matches the force on the first side (e.g. back side), thereby regulating the pressure in the flow channel 26 downstream of the valve member 14.

Figure 2:
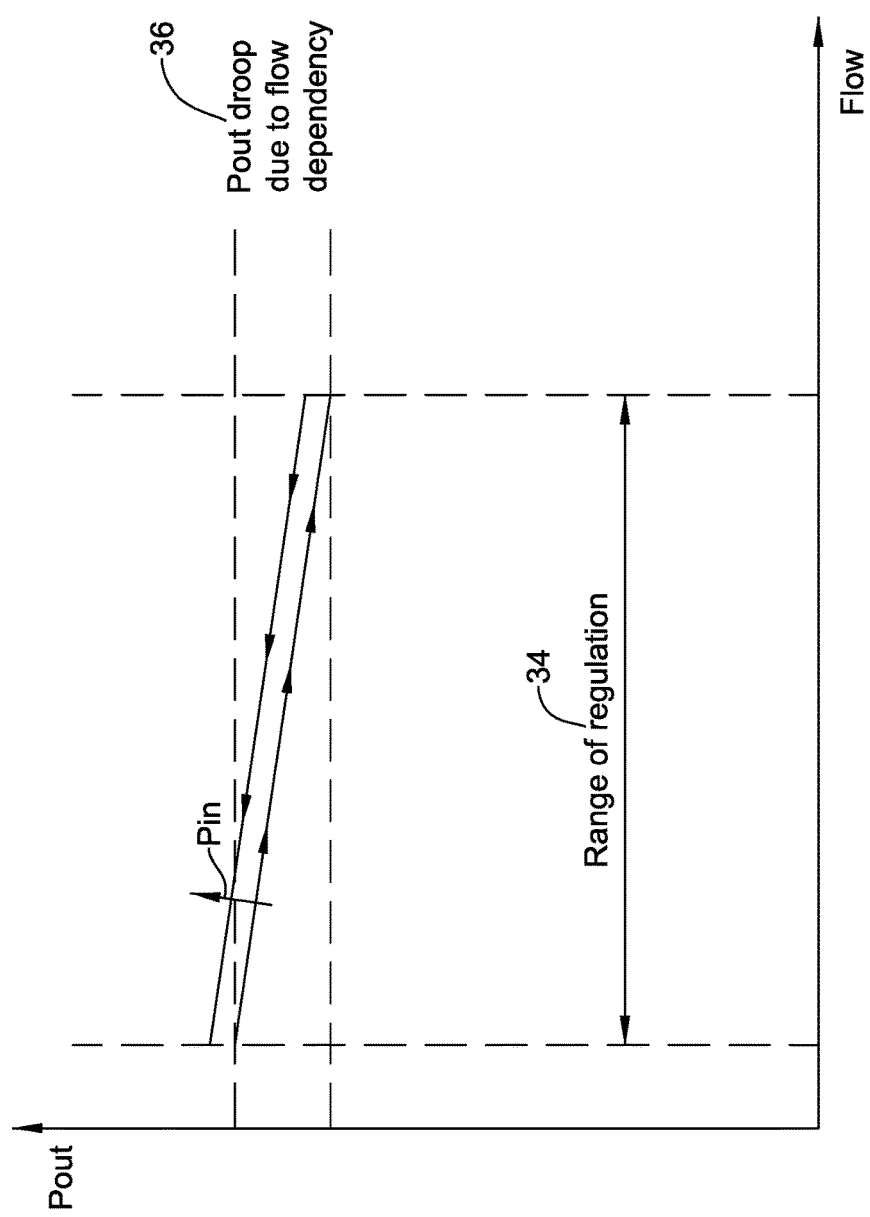
FIG. 2 is a graph of an illustrative output pressure versus flow rate curve for the prior art pressure regulator of FIG. 1.

The type of deflection of the diaphragm 12 in FIG. 1 and the resulting adjustment of the position of the valve member 14 relative to the valve seat 32 may introduce a flow-dependent error in the regulated pressure. FIG. 2 is a graph depicting this error. FIG. 2 shows a graph of an illustrative output pressure $P_{out}$ (i.e. pressure downstream of the valve seat 32) as the flow rate of the fluid flow across the valve member 14 increases over a range of regulation 34. The flow dependent error is evident from the drop in $P_{out}$, which is labeled "$P_{out}$ droop due to flow dependency 36" in FIG. 2, over the range of regulation 34. The droop may be, at least partially, the result of the flow rate of the fluid flow 24 across the valve member 14, causing a flow induced force to act on the valve member 14 and, as the valve member 14 is in communication with (e.g., mechanically connected to) the diaphragm 12, to act on the diaphragm 12, which can affect the set point of the PRV 10 (e.g., reducing the set point) and the resulting regulated output pressure $P_{out}$. The flow induced force is dependent on the current flow rate flowing past the valve member 14, which is dependent on the current position of the valve member relative to the valve seat 32. In some cases, a cause of the droop may be due to a valve member moving away from a valve seat to allow additional flow across the valve seat, which may reduce a bias force acting on a diaphragm when a spring is used as a bias mechanism and may lead to requiring less than expected downstream pressure to balance the forces acting on the diaphragm. Additionally, as is shown in the graph of FIG. 2, the pressure $P_{in}$ upstream of the valve seat 32 may affect the $P_{out}$ reading due to hysteresis caused at least in part by the flow induced force.

Figure 3:
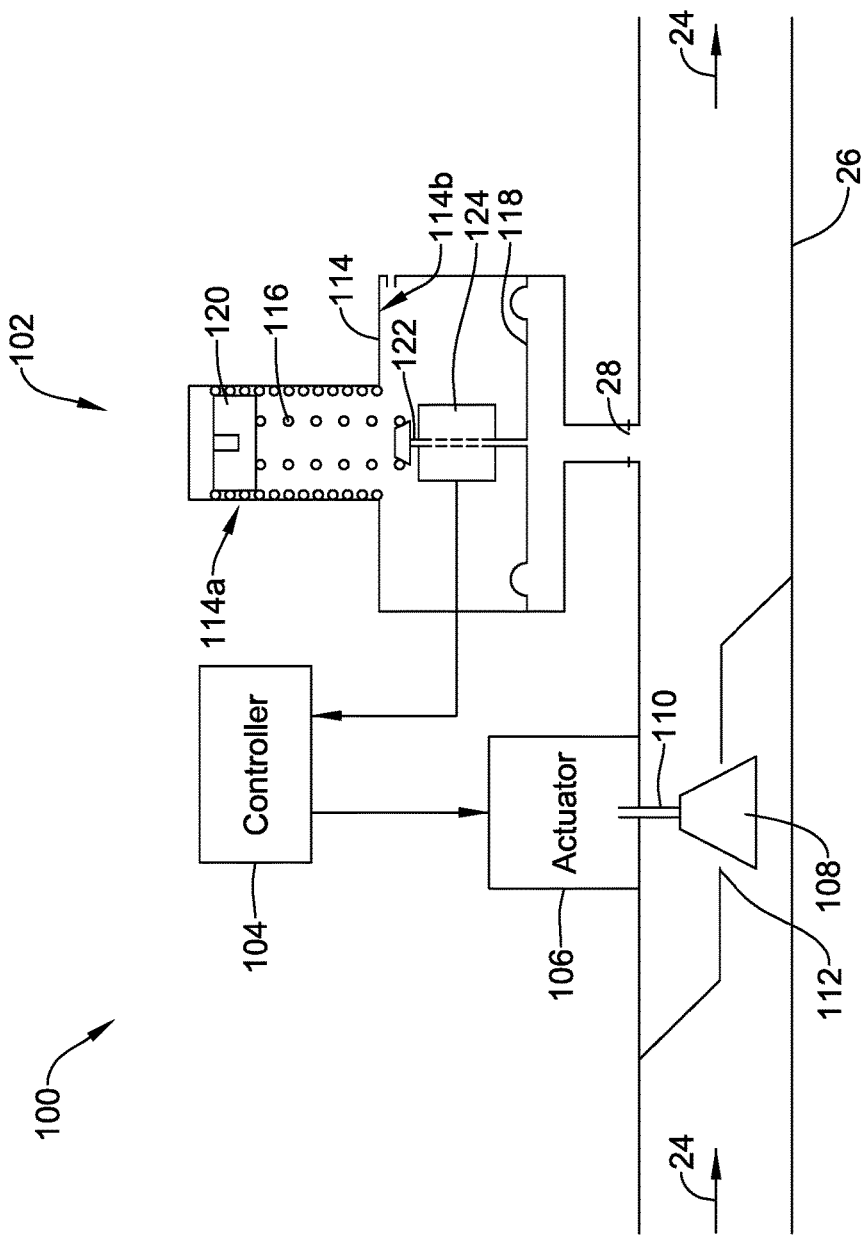
FIG. 3 is a schematic cross-sectional view of an illustrative improved pressure regulator assembly.

FIG. 3 is a schematic cross-sectional view of an illustrative improved pressure regulator assembly 100. The illustrative pressure regulator assembly 100 may include a pressure sensor 102, a controller 104 in communication with the pressure sensor 102, and a valve actuator 106. Such a pressure regulator assembly 100 may control output pressure $P_{out}$ regardless of input pressure and/or flow rates.

In the pressure regulator assembly 100 as compared to the PRV 10, electronics may be utilized to control the position of a valve in the flow channel 26, rather than controlling the valve position directly via the diaphragm 12 (see FIG. 1). For example, in the pressure regulator assembly 100, the valve actuator 106 drives the valve (e.g., a valve member 108 and connected valve stem 110) to adjust a pressure downstream of a valve seat 112 (e.g., a Pont) in response to a pressure value sensed by the pressure sensor 102. In operation, the valve actuator 106 may drive the valve until the pressure sensor 102 senses a set pressure. In such a pressure regulator assembly 100, the set pressure may be independent of flow rates and inlet pressure, and droop or error (e.g., error caused by hysteresis or other error) in $P_{out}$ may be reduced or eliminated.

The pressure sensor 102 may include a housing 114 having an exterior 114a and an interior 114b. A bias mechanism or a bias 116 (e.g., a spring) may be positioned at least partially within the interior 114b of the housing 114, and may act on a diaphragm 118 to apply a bias force or pressure thereon. In the example shown, the bias force or pressure applied to the diaphragm 118 by the bias 116 may be adjusted by adjusting (e.g., activating) a bias adjuster 120 (e.g., a bias or spring or spring-force adjusting mechanism) in communication with and/or acting on the bias 116.

The bias adjuster 120 may be any type of mechanism configured to adjust an amount of bias pressure/force that is applied to the diaphragm 118 by the bias 116. For example, the bias adjuster may be or may include a motor (e.g., a stepper motor, a servo motor, or other motor), a threaded mechanism (e.g., an adjustable screw or other threaded mechanism) that may engage threads of housing 114 and acts on the bias 116 as the threaded mechanism is threaded with threads of the housing 114, and/or one or more other bias adjusters 120 capable of adjusting an amount of force/pressure applied to the diaphragm 118 by the bias 116. In one example of when the bias adjuster 120 is threadedly engaged with threads of the housing 114, the bias adjuster may be rotated to advance or withdraw and change the amount of force/pressure applied to the diaphragm 118 by the bias 116.

The bias 116 may act directly on the diaphragm 118 or indirectly on the diaphragm 118 via stem 122 or other mechanism. A first end of the stem 122 may be in communication with the bias 116 and a second end of the stem 122 may be in communication with the diaphragm 118.

The pressure sensor 102 may further include a position sensor 124. In the example shown, the position sensor 124 may sense a position of the stem 122, which may be configured to move with movement of the diaphragm 118, which moves with changes in pressure downstream of the valve seat 112 (e.g., $P_{out}$). The stem 122 and/or the position sensor 124 may be positioned on a first side or a second side of the diaphragm 12, such that the position sensor 124 may sense the axial position of the stem 122.

The diaphragm 118 may be positioned within the housing 114 such that a first side (e.g. back side) of the diaphragm may face the bias 116 and a second side (e.g. front side) of the diaphragm may face the orifice 28 and/or fluid channel (e.g., a channel in fluid communication with the fluid flow 24 in the flow channel 26. The bias 116 may apply a force to the first side (e.g. back side) of the diaphragm 118, either directly or through another mechanism (e.g., stem 122 or other feature), which may be maintained unless the bias 116 is being adjusted. A force may be applied to a second side (e.g. front side) of the diaphragm 118 by a pressure in the flow channel 26. As the force applied to the first side (e.g. back side) of the diaphragm 118 acts as a reference for the pressure sensor 102 (e.g., the diaphragm 118), the diaphragm 118 may deflect when there is a change in pressure in the flow channel 26.

In response to a deflection or other movement of the diaphragm 118 due to a change in pressure in the flow channel 26, the stem 122 in communication with the diaphragm 118 longitudinally or axially translates. The position sensor 124 may sense the change in position of the stem 122 and/or simply a current position of the stem 122.

The pressure sensor 102 may have one or more benefits. For example, the pressure sensor 102 with a biased (e.g., a spring biased) diaphragm 118 and a position sensor 124 (e.g., when an LVDT pressure sensor or other similar pressure sensor is utilized) may provide accurate pressure readings around a zero-position of the diaphragm 118 (discussed below) and low drift in the pressure readings that can be caused by temperature and age of the pressure sensor 102.

The pressure regulator assembly 100 may be configured to keep the diaphragm 118 at a zero-position (e.g., a null position). The zero-position represents the, or substantially the, desired regulated pressure set point for the pressure regulator assembly 100. The zero-position of the diaphragm 118 is a position of the diaphragm 118 when the force applied thereto by the bias 116 is equal to or substantially equal to the force due to pressure in the flow channel 26 downstream of the valve member 108. To keep the diaphragm 118 at a zero position, the position sensor 124 may sense a position of the stem 122 and send the position of the stem 122 to the controller 104. If the position sensor 124 and/or the controller 104 identify that the stem 122 is not at a position indicative of a zero-position of the diaphragm 118, the controller 104 may send a signal (e.g., to the valve actuator 106) to adjust the valve member 108 relative to the valve seat 112. This will adjust the pressure on the diaphragm 118, and thus the position of the diaphragm 118, toward the zero-position. This feedback path may be used to regulate the pressure in the flow channel 26 downstream of the valve member 108. Further, although the pressure regulator assembly 100 may be described herein as utilizing a zero-position, the pressure regulator assembly 100 may rely on a different position of the diaphragm 118 and/or other configuration for regulating a pressure.

Figure 4:
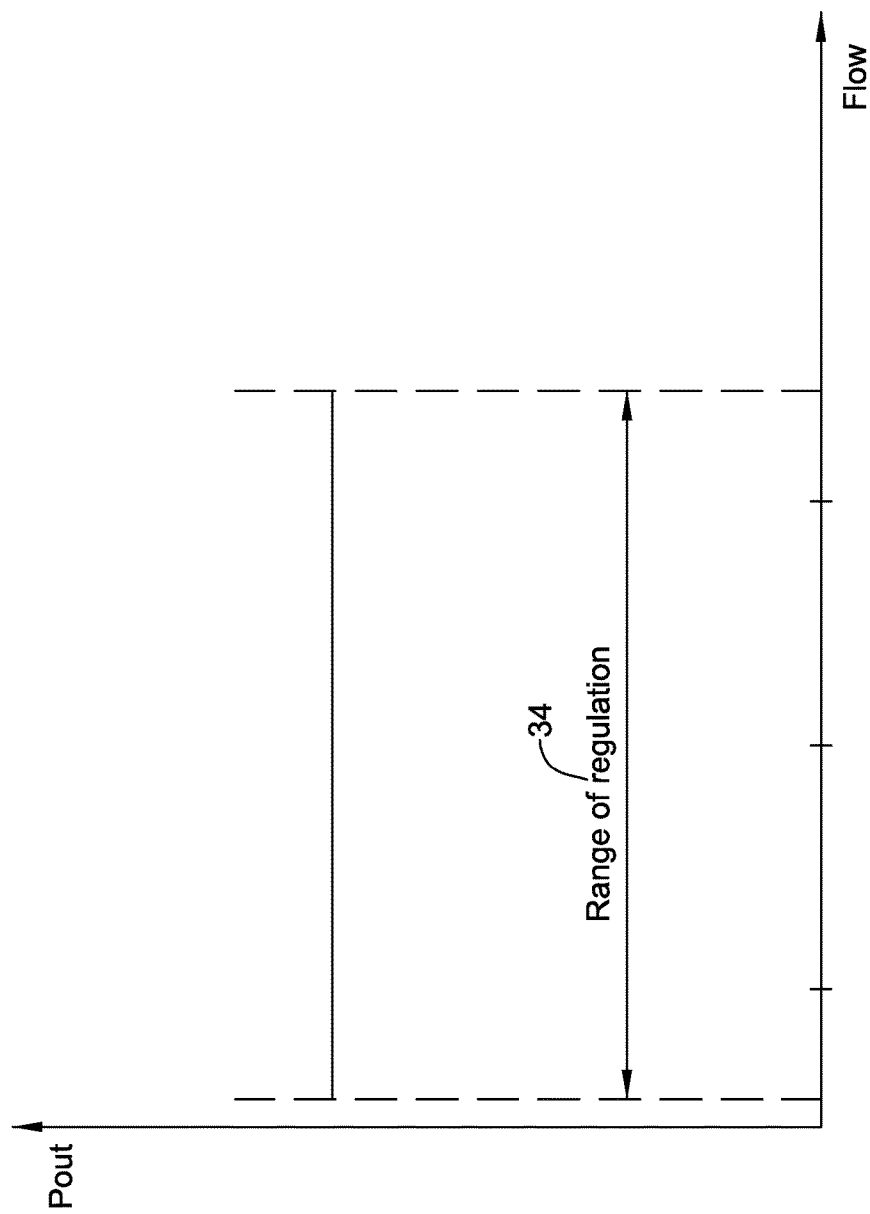
FIG. 4 is a graph of an illustrative output pressure versus flow rate curve for the improved pressure regulator of FIG. 3.

FIG. 4 shows a graph of an illustrative output pressure $P_{out}$ (i.e. pressure downstream of the valve seat 112 as the flow rate of the fluid flow across the valve member 108 increases over a range of regulation 34. As can be seen in FIG. 4, the configuration of the pressure regulator assembly 100 is able to maintain a constant or substantially constant pressure downstream of the valve member 108 ($P_{out}$) over the range of regulation 34 (e.g., which may be a predefined range of flow rates) and a range of input pressures $P_{in}$ (e.g., a predefined range of input pressures at an input port of the flow channel 26). As can be seen, the regulated output pressure $P_{out}$ may be independent of or substantially independent of flow rate of the fluid flow 24 across the valve seat 112, and may not have any or substantially any hysteresis across the range of pressure inputs $P_{in}$. From this, it may be seen that the set bias 116 applied to the diaphragm 118 may produce a corresponding constant or substantially constant regulated output pressure $P_{out}$ of the pressure regulator assembly 100.

The term "substantially" may be considered to be plus or minus five percent (5%) of a desired variable value over a range or ranges of dependent variable(s). For example, a substantially constant pressure downstream of a valve seat 112, referred to here as $P_{out}$, over a range of regulation 34, may be plus or minus 5% of a desired regulated pressure value over the range of regulation 34. In some cases, the pressure regulator valve assembly 100 may be able to maintain a pressure downstream of a valve seat 112 within plus or minus one percent (1%), two percent (2%), five percent (5%), ten percent (10%), fifteen percent (15%), or twenty percent (20%) of a desired regulated pressure value over the range of regulation 34.

When compared to the pressure regulating valve 10, the pressure regulator assembly 100 may produce a constant or substantially constant regulated pressure $P_{out}$ due, at least in part, to mechanically separating the positioning of the valve member 108 and the diaphragm 118. For example, because the diaphragm 118 of the pressure sensor 102 is not mechanically connected to the valve member 108, the valve member 108 does not mechanically act on the diaphragm in response to flow induced forces acting on the valve member 108, which affected the regulated output pressure of the PRV 10. Thus, the set point of the pressure sensor 102 is maintained constant or substantially constant over the flow rates of the fluid flow across the valve seat 112, resulting in no or substantially no $P_{out}$ droop due to flow dependency and no or substantially no hysteresis with changes in $P_{in}$.

Figure 5:
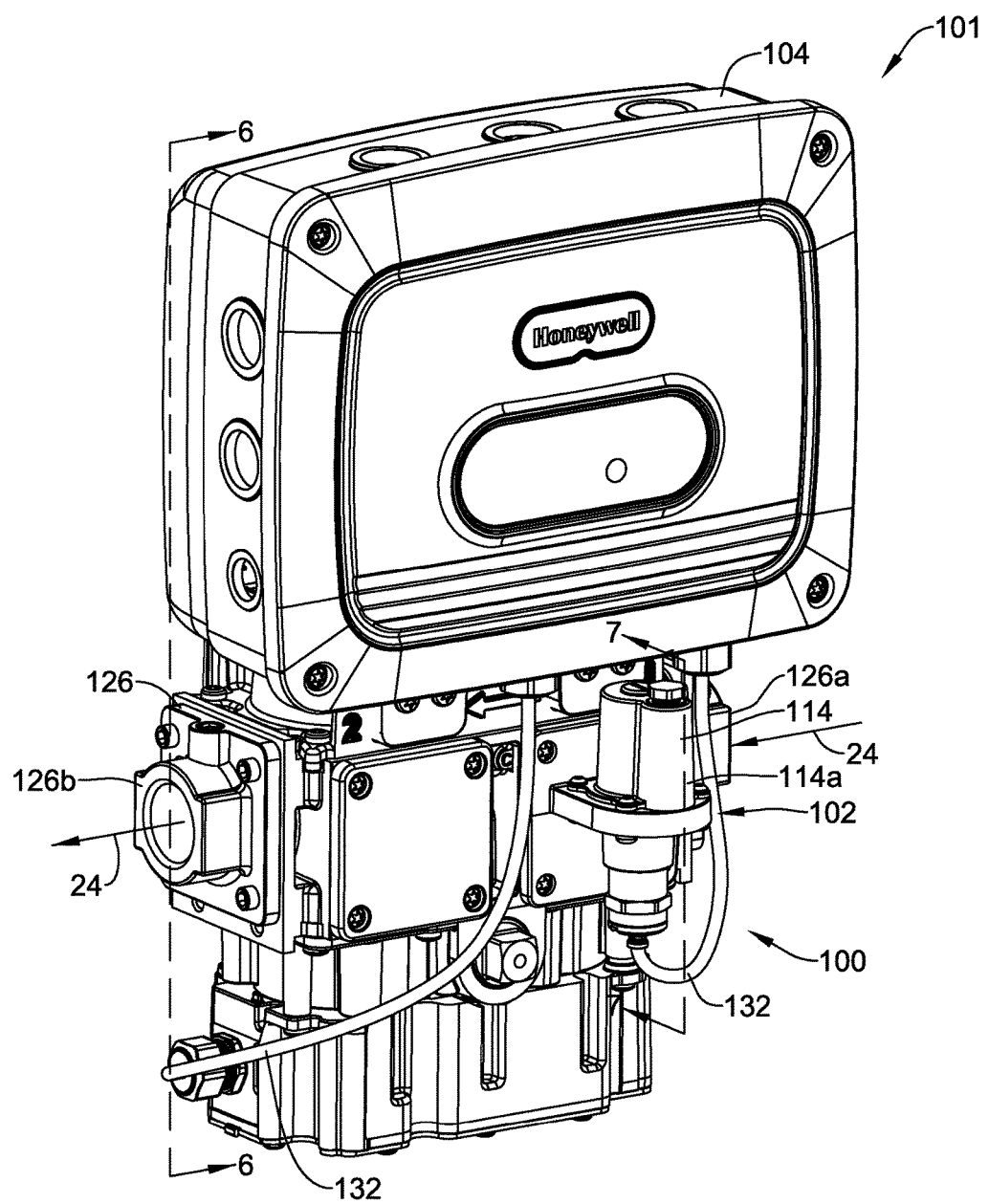
FIG. 5 is a schematic perspective view of an illustrative valve assembly for controlling fuel flow to a combustion appliance.
Figure 6:
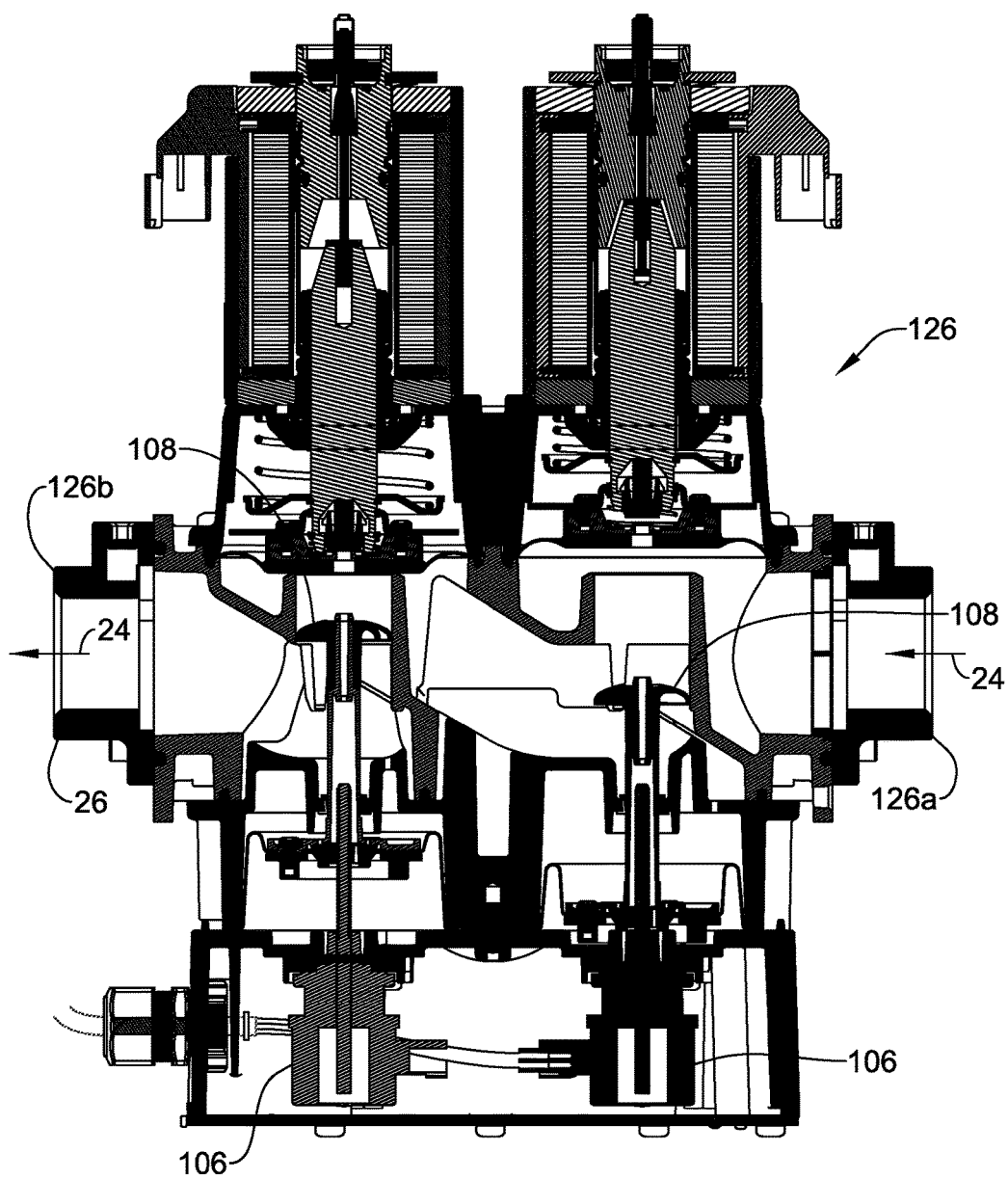
FIG. 6 is a schematic cross-sectional view of the illustrative pressure regulating valve configuration of FIG. 5, taken along line 6-6.
Figure 7:
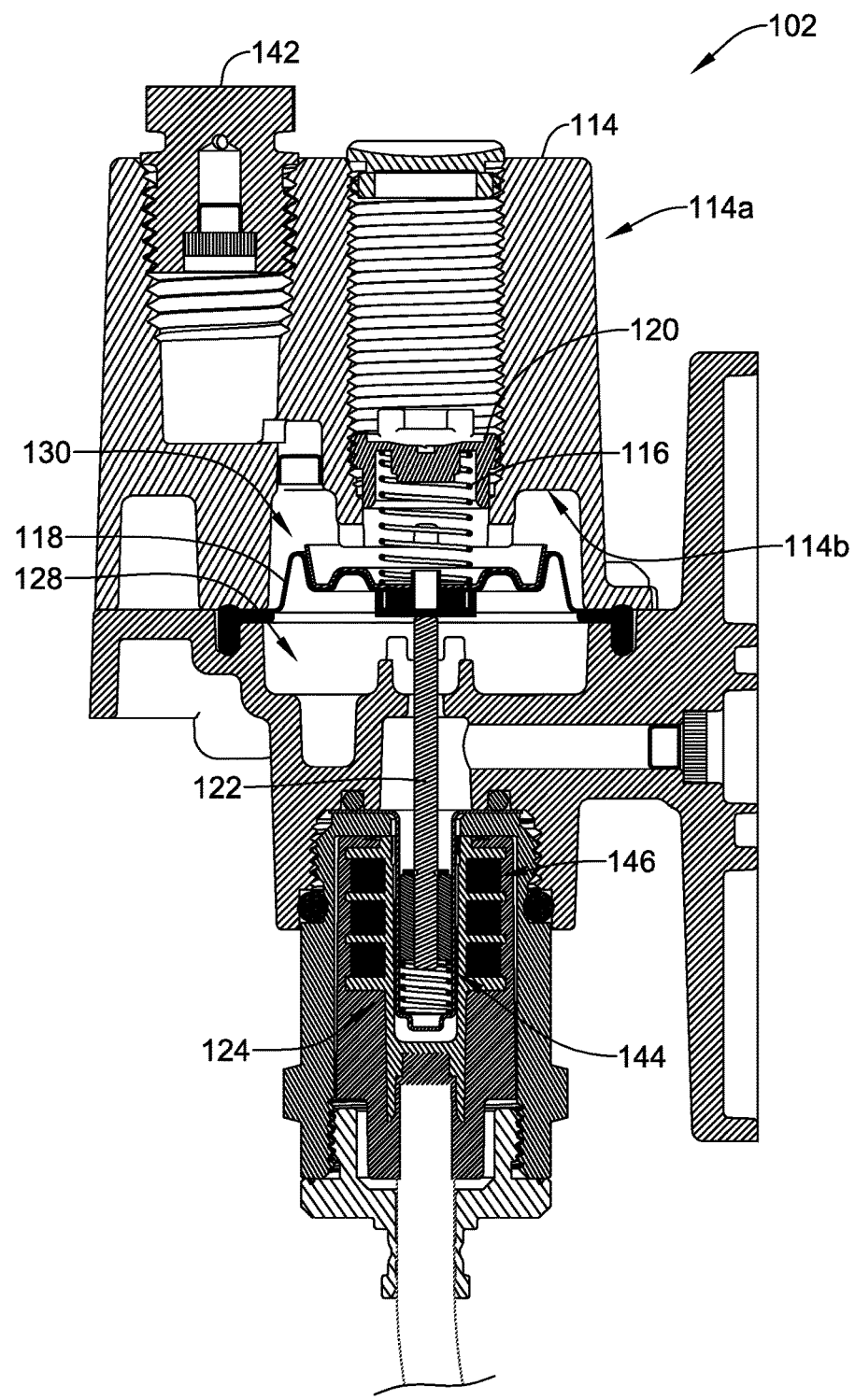
FIG. 7 is a schematic cross-sectional view of the illustrative pressure regulating valve configuration of FIG. 5, taken along line 7-7.

FIG. 5 is a schematic perspective view of an illustrative valve assembly 101 for controlling fuel flow to a combustion appliance. FIG. 6 is a cross-section taken along line 6-6 of FIG. 5 and depicts a cross-sectional view of the housing 126. FIG. 7 is a schematic cross-sectional view of the illustrative valve assembly 101 of FIG. 5, taken along line 7-7.

The illustrative valve assembly 101 may include a housing 126 with an inlet port 126a and an outlet port 126b, with a flow channel extends there between. The illustrative valve assembly 101 may further include a pressure regulator assembly 100 including a pressure sensor 102 and a controller 104. The controller 104 may be in operative communication with the pressure sensor 102 and one or more valve actuators 106 in the housing 126 (see FIG. 6). The illustrative valve assembly 101 may include one or more valve members 108 between the inlet port 126a and the outlet port 126b, where the valve actuators 106 control the position of the valve members 108. In some cases, the valve actuators 106 may be secured relative to the valve body or housing 126 and selectively move one or more of the valve members 108 relative to a first axis between a closed position, which closes the fluid path between the inlet port 126a and the outlet port 126b, and an open position.

The pressure regulator assembly 100 may include and/or be in communication with one or more of the valve members 108. For example, the pressure regulator assembly 100 may be in communication with a first valve member 108 and a second valve member 108 in the flow path or channel via one or more valve actuators 106. In such an example, the controller 104 may receive a position of the stem 122 or diaphragm 118 from the position sensor 124 and send a signal to one or more of the valve actuators 106 to adjust a position of the first valve member 108 and/or the second valve member 108 to re-position the diaphragm to the null position.

As best shown in FIG. 6, the housing 126 includes inlet port 126a and outlet port 126b, and a flow channel extending between the inlet port 126a and the outlet port 126b. The inlet port 126a is shown upstream of one or more valve members (e.g., valve member 108) and the outlet port 126b is shown downstream of the one or more valve members, where a pressure at the inlet port 126a may be considered an input pressure (e.g., $P_{in}$) and a pressure at the outlet port 126b may be considered an output pressure (e.g., $P_{out}$). Although the housing 126 is shown with two valve members 108 (e.g., two valve disks), the housing 126 may have a single valve member or more than two valve members.

A valve actuator 106 may be in communication with, coupled to, and/or coupled with the valve member 108 (e.g., a valve disk). The valve actuator 106 may be in communication with, coupled to, and/or coupled with the controller 104 and the valve member to control a position of the valve member. By controlling the position of the valve member 108, the valve actuator 106 may control a flow rate of the fluid flow 24 through the flow channel.

As best shown in FIG. 7, the pressure sensor 102 may include a diaphragm 118 and one or more sense elements 144 for sensing the current position of the diaphragm 118. The diaphragm 118 may separate (e.g., fluidly separate) or at least partially separate (e.g., at least partially fluidly separate) a pressure sensing chamber 128 from a reference chamber 130. The pressure sensing chamber 128 may be in fluid communication with the flow channel downstream of the valve member 108. The reference chamber 130 may be sealed, have a release valve/vent 142 (e.g., a vent limiting orifice), and/or may be in fluid communication with atmosphere, a combustion chamber, and/or other appropriate pressure reference, depending on the application. When provided, the release valve/vent 142 may dampen a transient response of the pressure regulator assembly 100 due to pressure fluctuations, and a size of an orifice of the release valve/vent 142 may be adjusted to change (e.g., improve) the dynamic performance of the pressure regulator assembly 100.

A bias mechanism 116 may be included in the pressure sensor 102 for applying a bias force (e.g., a pressure) to the back side of the diaphragm 118. The bias mechanism 116 may apply a bias force to the diaphragm 118 in a direction toward the pressure sensing chamber. As such, a pressure differential (e.g., a positive or negative pressure differential) between the pressure sensing chamber 128 and reference chamber 130 may provide a counter force (e.g., from the pressure in the pressure sensing chamber 128) to the bias force applied to the diaphragm 118 by the bias mechanism 116. Thus, a current position of the diaphragm 118 may be dependent on a differential between the bias force and the counter force. The current position of the diaphragm 118 may be detected by a position sensor, such as position sensor 124.

In one example of a counter force acting on a diaphragm 118, the counter force may decrease when the pressure differential between the pressure sensing chamber 128 and the reference chamber 130 decreases. Similarly, the counter force may increase when the pressure differential between the pressure sensing chamber 128 and the reference chamber 130 increases. As the counter force changes, so does the position of the diaphragm 118. The position sensor 124 may detect the position of the diaphragm 118, which may reflect the pressure in the pressure sensing chamber 128 (and thus the pressure in the flow channel downstream of the valve member 108).

As shown in FIG. 7, a stem 122 may be operatively coupled to the diaphragm 118. The stem 122 may extend toward and/or through the pressure sensing chamber 128 (as shown in FIG. 7) or toward and/or through the reference chamber 130 (not shown). In FIG. 7, the position sensor 124 may be utilized for sensing the axial position of the stem 122, and because the stem 122 is operatively coupled to the diaphragm 118, the position sensor 124 may detect a change in pressure in the pressure sensing chamber 128. Thus, the diaphragm 118 may translate a pressure in the flow channel downstream of the valve member 108 into a position value of the stem 122, and the position sensor 124 may translate the position value of the stem into an electrical value (e.g., an electrical signal) to be sent to the controller 104. The position sensor 124 may be configured to detect the axial position of the stem 122 and, in some cases, send the axial position of the stem 122 to the controller 104 for analysis.

The position sensor 124 may include one or more sense elements 144 and one or more field sensors 146, where the field sensors 146 may detect one or more of the sense elements 144. In some cases, the one or more sense elements 144 may be connected to or formed with the stem 122. As such, the one or more sense elements 144 and/or the field sensors 146 may be in operative communication with the diaphragm 118.

In some cases, the one or more sense elements 144 may include a marking, a magnet, a ferrous core, and/or other sense element 144 that may be attached to or formed with the stem 122. A field sensor 146 may be an optical sensor, a magnetic field sensor, a Linear Variable Differential Transformer (LVDT), a Hall Effect sensor, and/or any other suitable field sensor 146. The stem 122 may have a range of travel and the field sensor may sense a current axial position of the stem 122 (e.g., the axial position of the sense element on the stem 122) along the range of travel of the stem 122.

In one example, the field sensor 146 may be a LVDT and the sense element may be a ferrous core of or attached to the stem 122. In this example, the LVDT may have a null position output when it sense the ferrous core of the stem 122 at a null position. In some cases, a null position may be when the counter force acting on the diaphragm 118 is equal to or substantially equal to a set point force/pressure (e.g., a bias force/pressure applied to the diaphragm 118 by a bias 116). With an LVDT field sensor 146, temperature may be relatively easily derived by the controller 104 by delivering and measuring a current through the LVDT coils. Since the LVDT coils often have a known relationship between resistance in the LVDT coils and temperature, the controller 104 may calculate the current temperature in the valve. The controller 104 may then use this calculated temperature to perform temperature compensation so that the regulated output pressure $P_{out}$ is also constant or substantially constant over a predetermined temperature range.

The field sensor 146 may be positioned within the housing 114 and/or may be positioned exterior to the housing 114. In some cases the field sensor 146 is positioned exterior to the housing 114 and radially spaced from a longitudinal axis of stem 122. Field sensors 146 may be positioned so as to be entirely exterior to fluid flow through the flow channel The meaning of entirely exterior of fluid channel may include all field sensors 146 and all electronics (e.g., wires, circuit boards) connected to position sensor(s) 48 being exterior to the fluid channel. This may be beneficial when the fluid flow is natural gas or the like for a combustion appliance, where it is often not desirable to have electrical components in direct contact with the gas as this may present a fire hazard. In some cases, the field sensor 146 may be spaced from the one or more sense elements 144 on the stem 122 such that the field sensor 146 may detect a position of the one or more sense elements 144 and thus, the position of the stem 122 through the housing 114. Where field sensor(s) 146 include(s) an LVDT, the LVDT may be positioned concentrically around and radially spaced from stem 122, as best shown in FIG. 7, or in a different position if desired.

Figure 8:
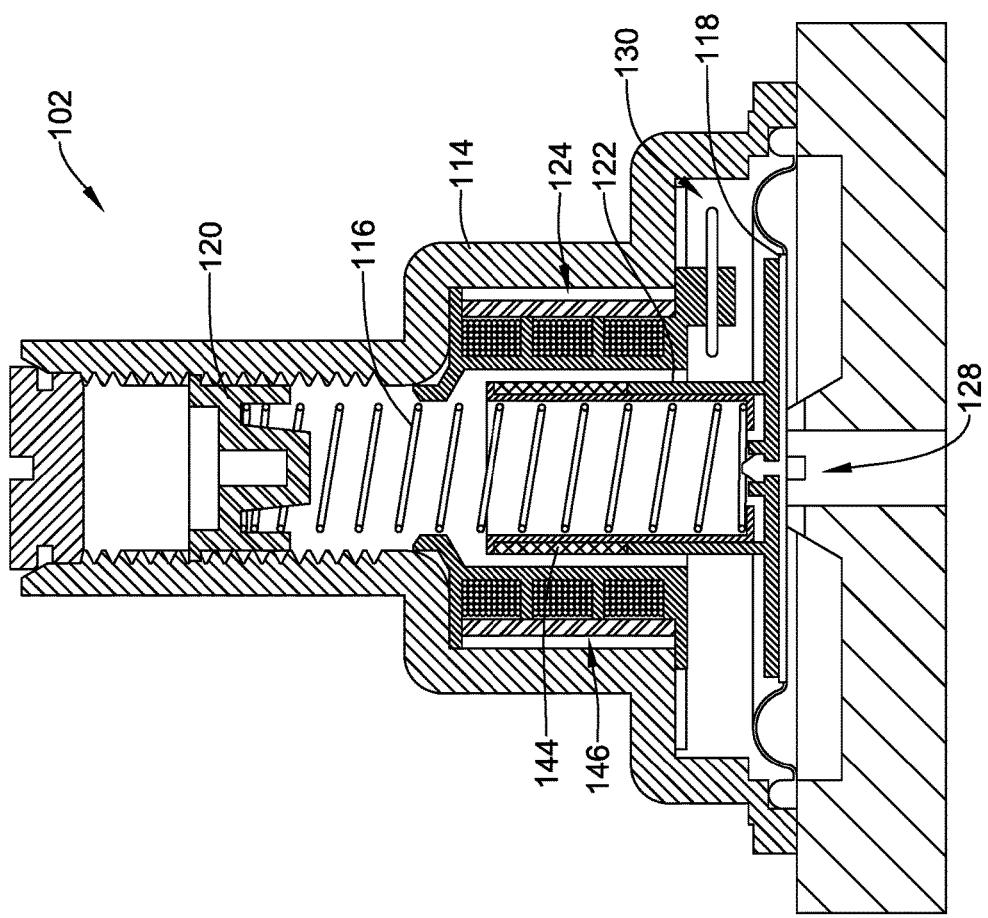
FIG. 8 is a schematic cross-sectional view of another illustrative pressure regulator for use with a pressure regulating valve.
Figure 9:
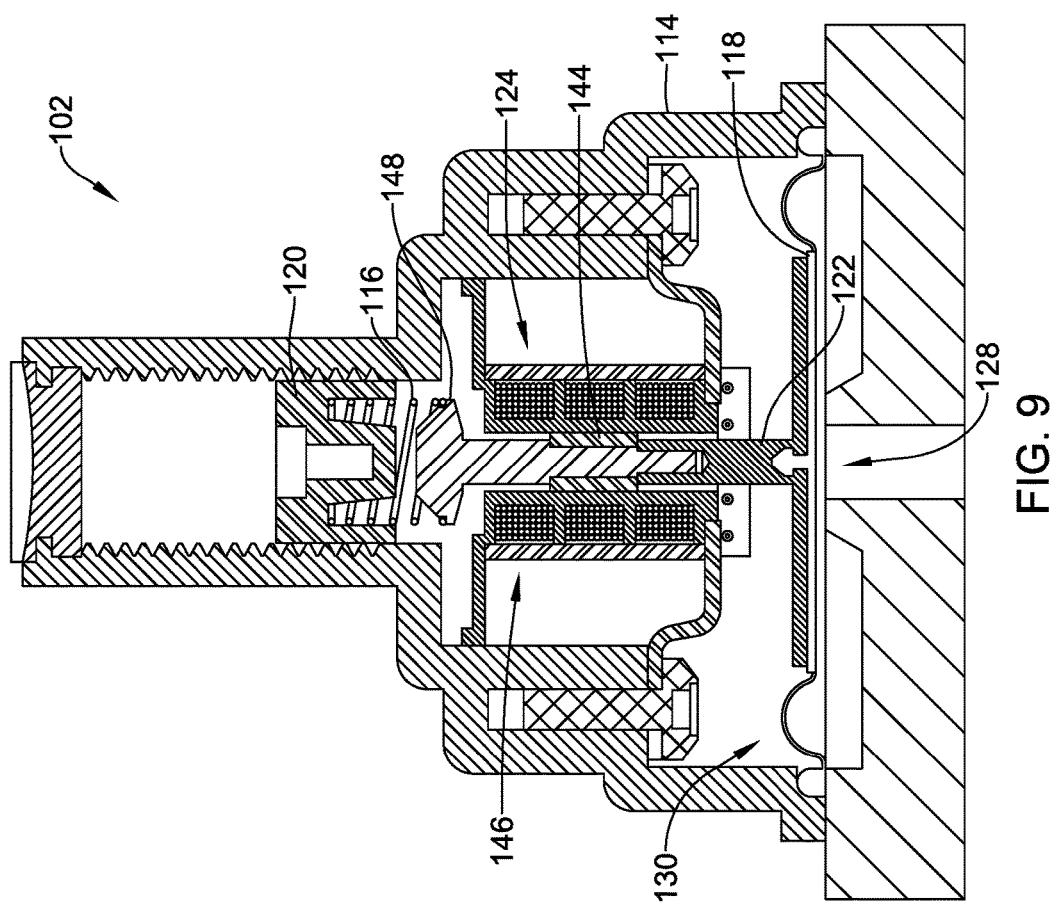
FIG. 9 is a schematic cross-sectional view of another illustrative pressure regulator for use with a pressure regulating valve.

FIGS. 8 and 9 show alternative pressure regulators 102. In FIG. 8, the bias 116 is positioned at least partially within the stem 122 and extends to a position near the diaphragm 118. In FIG. 9, the bias 116 is positioned substantially entirely above the stem 122 and extends between the bias adjuster 120 and a stem seat 148. In these examples, the bias 116 applies a force/pressure to the stem 122, which in turn applies a force/pressure to the diaphragm 118.

Figure 10:
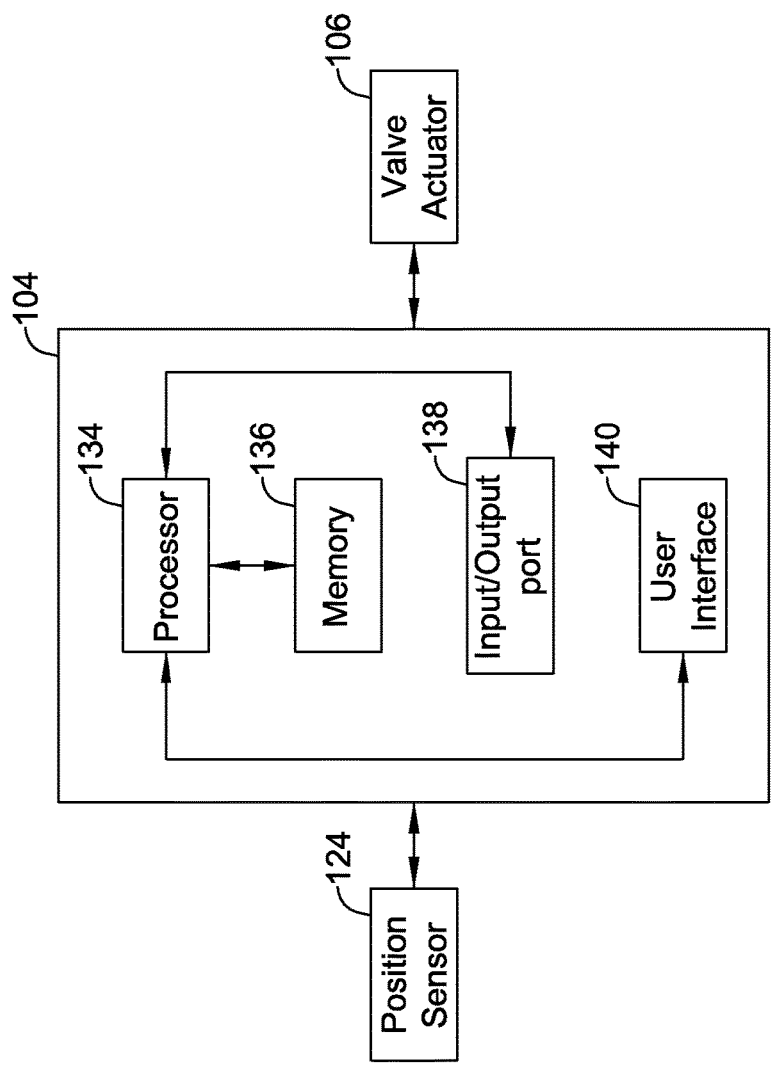
FIG. 10 is a schematic block diagram depicting an illustrative pressure regulator controller.

As discussed and shown in FIGS. 5 and 10, the controller 104 may be operatively coupled to and/or in communication with the valve actuator 106 and the position sensor 124. In some cases, the controller 104 may be coupled to the valve actuator 106 and/or the position sensor 124 via one or more electrical connectors 132, such as shown in FIG. 5. In one example, and as shown in FIG. 10, the controller 104 may include a processor 134, a memory 136, an input/output port 138, user interface 140, and/or one or more other components.

It is contemplated that the controller 104 may be physically secured to or coupled to, or secured or coupled relative to, the valve housing 126. In some instances, controller 104 may be considered a portion of the pressure sensor 102 or valve assembly 101 (e.g., including housing 126, valve members 108, and/or valve actuator 106), the pressure sensor 102 or valve assembly 101 may be considered a portion of the controller 104, or one or more of the controller 104, the pressure sensor 102, and the valve assembly 101 may be considered separate systems or devices.

The controller 104 may control the valve actuator(s) 106 and thus a position of the valve member(s) 108. The position of the valve member 108 may be controlled based, at last in part, on a current position of the diaphragm 118 (e.g., via the stem in communication with the diaphragm 118 or via another feature indicative of a position of the diaphragm, including the diaphragm). The position of the valve member 108 may be controlled by the controller 104 to drive the current position of the diaphragm 118 to a control position that results in a constant or substantially constant pressure at the output port of the housing, $P_{out}$, over a predefined range of fluid flow rates and a predefined range of input pressures. In some cases, the control position of the diaphragm 118 corresponds to a null position output of a LVDT position sensor 124, and the controller 104 may instruct the valve actuator 106 to move the valve member 108 such that the one or more sense elements 144 are driven to the null position, and the diaphragm 118 is driven to a control position. In such a case, a constant or substantially constant pressure at the output port of the housing, $P_{out}$, may result over a predefined range of flow rates, a predefined range of input pressures, and/or a predefined range of temperatures.

The memory 136, which in some cases may be part of controller 104, may be configured to record data related to sensed pressures (e.g., positions of the diaphragm, etc.), sensed differential pressures, sensed temperatures, and/or other measures. The controller 104 may access this data, and in some cases, communicate (e.g., through a wired or wireless communication link) the data and/or analyses of the data to other systems (e.g., a system level or central building control). The memory 136 and/or other memory may be programmed and/or developed to contain software to affect one or more of the configurations described herein.

Figure 11:
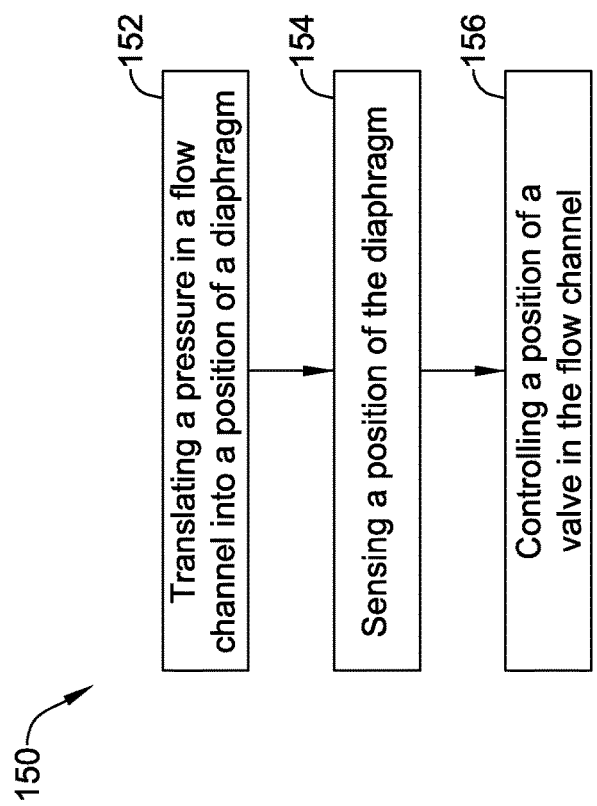
FIG. 11 is a schematic flow diagram showing an illustrative method of operating a pressure regulating valve assembly.

As disclosed herein, the pressure regulator assembly 100 may be utilized in an illustrative method 150 of regulating a pressure in a flow channel, as shown in FIG. 11. The method 150 may include translating 152 a pressure in the flow channel into a position of a diaphragm 118 of the pressure sensor 102. The diaphragm 118 may fluidly or otherwise separate a pressure sensing chamber 128 and a reference chamber 130, where the pressure sensing chamber 128 may be in fluid communication with the pressure in the flow channel and the diaphragm may move in response to changes in differential pressure between the pressure sensing chamber 128 and the reference chamber 130.

The position of the diaphragm 118 may be dependent on the pressure in the flow channel and thus, when the pressure in the flow channel changes, the position of the diaphragm 118 changes. The position of the diaphragm 118 may be sensed 154. In one example, the position of the diaphragm may be sensed with a position sensor 124. The position sensor 124 may be an LVDT or other position sensor, where the LVDT or other position sensor may be capable of sensing a range of positions of the diaphragm 118 including a null position.

The method 150 may further include controlling 156 a position of a valve member 108 in the flow channel of the pressure regulator assembly 100 to adjust the pressure in the flow channel acting on the diaphragm 118. Such control of the valve member 108 may be based on the sensed position of the diaphragm 118 so that the sensed position of the diaphragm 118 is driven toward a predetermined position (e.g., a position corresponding to the null position). In one example, the valve member 108 may be controlled to maintain a constant or substantially constant pressure in the flow channel over a predefined range of flow rates through the flow channel, over a predefined range of input pressures, and/or over a predefined range of temperatures.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A pressure regulator comprising:
   a housing having an input port and an output port, with a flow channel extending between the input port and the output port, the inlet port having an inlet pressure and the output port having an outlet pressure;
   a valve member situated in the flow channel, the valve member separating an upstream side of the flow channel from a downstream side of the flow channel;
   a valve actuator operatively coupled to the valve member for controlling a position of the valve member and thus a flow rate of fluid through the flow channel;
   a pressure sensor comprising:
      a pressure sensing chamber and a reference chamber, with a diaphragm fluidly separating the pressure sensing chamber from the reference chamber, the pressure sensing chamber is in fluid communication with the downstream side of the flow channel;
      a bias mechanism for applying a bias force against the diaphragm, wherein a pressure differential between the pressure sensing chamber and the reference chamber provides a counter force to the bias force, and wherein a current position of the diaphragm is dependent on a differential between the bias force and the counter force, and wherein the diaphragm is configured to move in a direction toward the bias mechanism in response to an increase in pressure in the pressure sensing chamber relative to the reference chamber resulting in an increase in the counter force, and in a direction away from the bias mechanism in response to a decrease in pressure in the pressure sensing chamber relative to the reference chamber resulting in a decrease in the counter force;
      a position sensor for sensing the current position of the diaphragm, wherein the position sensor comprises a Linear Variable Differential Transformer (LVDT) operatively coupled to the diaphragm, the LVDT having a coil; and
   a controller in communication with the valve actuator and the position sensor, wherein the controller is configured to send an electrical control signal to the valve actuator to control the valve actuator, and thus the position of the valve member, based at least in part on an electrical signal from the position sensor indicating the current position of the diaphragm such that a constant or substantially constant pressure results at the output port of the housing over a predefined range of input pressures;
   the controller further configured to:
      determine a resistance of the coil of the LVDT;
      determine a temperature of the coil based at least in part on the determined resistance of the coil; and
      perform a temperature compensation of the electrical control signal such that a constant or substantially constant pressure results at the output port of the housing over a predefined temperature range.

2. The pressure regulator of claim 1, wherein the bias mechanism comprises a spring.

3. The pressure regulator of claim 2, further comprising a spring adjustment mechanism for adjusting the bias force applied by the spring against the diaphragm.

4. The pressure regulator of claim 1, wherein the reference chamber is in fluid communication with atmosphere via a vent opening to atmosphere.

5. The pressure regulator of claim 1, wherein the reference chamber is sealed or is in fluid communication with an appliance combustion chamber.

6. The pressure regulator of claim 1, wherein the LVDT has a null position, and wherein the controller is configured to instruct the valve actuator to move the valve member such that the diaphragm is moved so that the LVDT is driven toward the null position.

7. The pressure regulator of claim 1, wherein the controller is configured to control the valve actuator, and thus the position of the valve member, such that a constant or substantially constant pressure results at the output port of the housing over a predefined range of flow rates, a predefined range of input pressures, and a predefined range of temperatures.

* * * * *